March 11, 1947. W. S. NUTTER 2,417,319
FLAT WOVEN FABRIC AND METHOD OF MAKING THE SAME
Filed Jan. 25, 1946
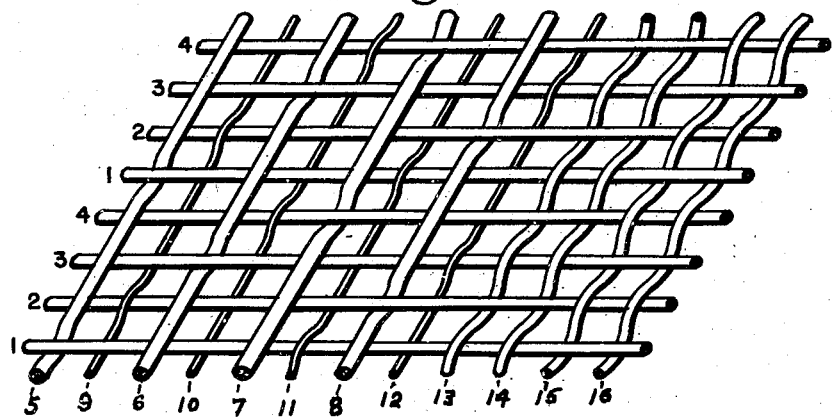
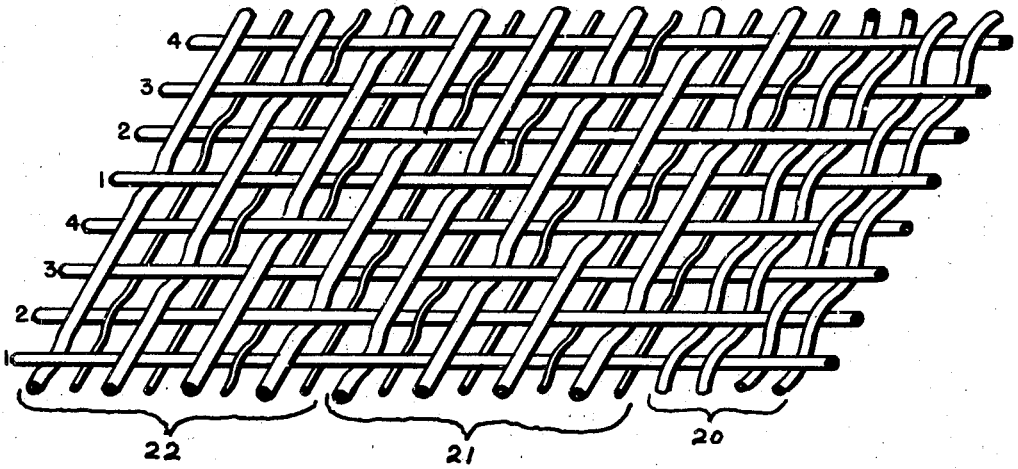
Inventor:
William S. Nutter,
by Heard Smith & Tennant
Attorneys Patented Mar. 11, 1947

2,417,319

UNITED STATES PATENT OFFICE 2,417,319

FLAT WOVEN FABRIC AND METHOD OF MAKING THE SAME

William S. Nutter, Sanford, Maine, assignor to Goodall-Sanford, Inc., Sanford, Maine, a corporation of Maine Application January 25, 1946, Serial No. 643,304

6 Claims. (Cl. 139—427)

The object of this invention is the production of a flat woven fabric particularly suitable for upholstery and similar purposes in which the characteristic qualities of animal fiber and more particularly mohair fiber are secured in the most efficient and economical manner. The characteristics of animal fiber, and particularly mohair fiber, of appearance, durability, wearing qualities and strength are well known and universally appreciated in fabrics employed for upholstery and similar purposes, but these fibers are relatively expensive and it is not necessary nor is it, in fact, desirable that they should constitute the entire composition of the fabrics.

The object of the present invention is to produce a woven flat fabric in which the animal fiber shall be employed to the minimum extent or most economically to give the required appearance, strength, durability and wearing qualities characteristic of such fiber to the entire fabric for the required purpose.

The further object is to construct such a fabric by lowering the cost due to the economical use of the animal fiber but without reducing the appearance, strength, durability or wearing qualities of the fabric as a whole as required for upholstery or similar purposes.

The further object of the invention is to secure these results by a peculiar disposition of the animal fiber and the other less expensive fibers employed both by the disposition of the fibers in the yarns making up the fabric and by the disposition of these yarns in the fabric structure.

While the invention may employ any suitable animal fiber, it is illustrated in connection with mohair widely employed in upholstery and similar fabrics because of its well-known, highly efficient qualities.

The fabric of this invention is composed of wefts, face warps, back warps, and cord warps dispositioned in the fabric in accordance with the principles hereinafter set forth, and in the preferred form the animal fiber, as stated, is mohair.

The wefts are composed substantially of mohair and may be entirely of mohair or of a mixture in which mohair so predominates as to give the yarns the essential characteristics of mohair. For a specific illustration, as in a fabric suitable for automobile upholstery, these wefts may be a single 22 yarn composed of 20% mohair, 40% medium luster wool and 40% medium fine wool.

The face warps are also substantially of mohair, and as in the case of the wefts, may be entirely of mohair or of a mixture in which mohair so predominates as to give the yarns the essential characteristics of mohair. These face warps are relatively large as compared with the back warps and for a specific illustration may be a two-ply yarn of the same count and the same composition as the wefts.

The back warps are relatively much finer than the face warps, and the essential characteristics thereof are: they must have strength, smooth surface, and may be composed of any suitable vegetable or synthetic fiber. Cotton is suitable for this purpose, also either spun or filament rayon or synthetic fibers or mixtures or plies of the different fibers. As a specific illustration, these back warps may be when cotton fiber is employed as suggested a two-ply 30 count.

The cord warps are relatively large as compared with the back warps. They may be formed as in the case of the back warps of any suitable vegetable or synthetic fiber or mixtures or plies thereof, and in the specific illustration may be cotton or the same fiber as the back warps and a three-ply 30 count.

In the structure of the fabric one or more groups each group consisting of four face warps and four back warps alternate with a group of four cord warps, the face and back warps in each group each form a broken twill with the face warps forming an $$\frac{X}{1}$$

broken twill weave and the back warps forming a $$\frac{1}{X}$$

broken twill weave in which X is a number greater than 2. Preferably the face warps weave in a $$\frac{3}{1}$$

broken twill in 1, 3, 4, 2 order, and the back warps in a $$\frac{1}{3}$$

broken twill in 2, 4, 1, 3 order, the twill weaves of the face and back warps alternating successively. Thus it will be seen that the floats of the face warps are on the face of the fabric and the floats of the back warps on the back of the fabric. The cord warps weave in pairs oppositely as flats over and under alternate wefts.

The result is in the finished fabric that the face warps and the wefts conceal the back warps which only come up to the face at relatively long intervals and are, therefore, readily covered by the larger and more or less fluffy mohair warps and wefts. Also the long floats of the mohair face warps at each side of the group of cord warps spread out over the cord warps to such an extent as to render the cord warps quite inconspicuous at the face of the fabric. Thus the fabric so constructed presents in the illustrated case an essentially mohair face coverage. At the same time, the construction employed is such that the yarns are held against slipping with respect to each other and the fabric is rendered firm and well balanced. The mohair fiber is brought to the face where it is most effective for durability, wearing qualities and appearance while great ample strength is secured by the disposition and qualities of the back warps and cord warps. As already pointed out, while mohair has been referred to as the preferred fiber, this is but illustrative of any suitable animal fiber.

The nature and construction and the method of forming the fabric embodying the invention will more fully appear from the accompanying drawings and will be particularly defined in the claims.

In the drawings:

Fig. 1 is a diagrammatic illustration with the various yarns widely separated showing a preferred embodiment of the invention with a single group of four face warps and four back warps alternating with the group of cord warps.

Fig. 2 is a weave diagram of the construction shown in Fig. 1.

Fig. 3 is a view similar to Fig. 1 in which two groups each of four face warps and four back warps alternate with the group of cord warps.

In Fig. 1 the wefts are numbered 1, 2, 3, 4, the face warps of the group 5, 6, 7 and 8 and the back warps of the group 9, 10, 11 and 12, the first pair of cord warps 13, and 14 and the second pair 15 and 16. It will be seen in this construction the face warps form a broken twill with the long floats on the face of the fabric and with the broken twill being $$\frac{3}{1}$$

with the order 1, 3, 4, 2, that is, the face warp 5 passes under weft 1, the face warp 6 under weft 3, the face warp 7 under weft 4, and the face warp 8 under weft 2. The back warps form a similar but reversed twill $$\frac{1}{3}$$

with the long floats on the back of the fabric and alternating with the face warps in 2, 4, 1, 3 order, that is, the back warp 9 passes over weft 2, the back warp 10 over weft 4, the back warp 11 over weft 1, and the back warp 12 over weft 3. The pair of cord warps 13, 14 weave as flats, and the cord warps 15, 16 weave as flats and the pairs weave opposite to each other over and under the alternate wefts. This construction is shown in the weave diagram of Fig. 2 where the face warps are indicated at F, the back warps at B, and the cord warps at C.

It will be seen that since the back warps only appear at scant intervals at the face of the fabric, for instance, the back warp 9 appearing over the wefts 2, the back warp 10 over the wefts 4, the back warp 10 over the wefts 1, and the back warp 12 over the wefts 3, but when the fabric is finished, these points are readily concealed by the mohair wefts and mohair face warps. So also the long floats of the face warps which come next to the cord warps as the repeat continues laterally spread over and render inconspicuous the cord warps.

The construction in Fig. 3 is the same as that illustrated in Figs. 1 and 2 except that in this case two groups each composed of four face and four back warps alternate with the group of cord warps. The group of cord warps 20 and the group of face warps and back warps 21 is the same as illustrated in Fig. 1, but a second group of face warps and back warps 22 is employed so that the two groups 22 and 21 alternate with the single group of cord warps.

Having thus described the invention, what is claimed as new, and desired to be secured by Letters Patent, is:

1. A flat fabric presenting an essentially mohair face covering which consists of wefts composed substantially of mohair and one or more groups of four face warps each composed substantially of mohair and four back warps each finer than the face warps and essentially strong, smooth surfaced and composed of vegetable or synthetic fiber, alternating with a group of four large cord warps smooth surfaced and composed of vegetable or synthetic fiber, the cord warps weaving in pairs oppositely as flats over and under alternate wefts, the face warps forming a $$\frac{3}{1}$$

broken twill weave in 1, 3, 4, 2 order and the back warps forming a $$\frac{1}{3}$$

broken twill weave alternating successively with the face warps in 2, 4, 1, 3 order, with the floats of the face warps thus on the face, and the floats of the back warps on the back, of the fabric, the back warps acting to hold the face warps against slipping, the face warps and wefts concealing the back warps at the face of the fabric, and the face warps spreading out and rendering inconspicuous the cord warps at the face of the fabric.

2. A flat face fabric presenting an essentially animal fiber face coverage which consists in wefts composed substantially of animal fiber and one or more groups of four face warps each composed substantially of animal fiber and four back warps each finer than the face warps and essentially strong, smooth surfaced and composed of vegetable or synthetic fiber, alternating with a group of four large cord warps smooth surfaced and composed of vegetable or synthetic fiber, the cord warps weaving in pairs oppositely as flats over and under alternate wefts, the face warps forming a $$\frac{3}{1}$$

broken twill weave in 1, 3, 4, 2 order and the back warps forming a $$\frac{1}{3}$$

broken twill weave alternating successively with the face warps in 2, 4, 1, 3 order, with the floats of the face warps thus on the face, and the floats of the back warps on the back, of the fabric, the back warps acting to hold the face warps against slipping, the face warps and wefts concealing the back warps at the face of the fabric, and the face warps spreading out and rendering inconspicuous the cord warps at the face of the fabric.

3. A flat fabric presenting an essentially mohair face covering which consists of wefts composed substantially of mohair and one or more groups of four face warps each composed substantially of mohair and four back warps each finer than the face warp and essentially strong, smooth surfaced and composed of vegetable or synthetic fiber, alternating with a group of four large cord warps smooth surfaced and composed of vegetable or synthetic fiber, the cord warps weaving in pairs oppositely as flats over and under alternate webts, the face warps forming an $$\frac{X}{1}$$

broken twill weave and the back warps forming a $$\frac{1}{X}$$

broken twill weave alternating successively with the face warps and where X is a number greater than 2, with the floats of the face warps thus on the face, and the floats of the back warps on the back, of the fabric, the back warps acting to hold the face warps against slipping, the face warps and wefts concealing the back warps at the face of the fabric, and the face warps spreading out and rendering inconspicuous the cord warps at the face of the fabric.

4. A flat face fabric presenting an essentially animal fiber face coverage which consists in wefts composed substantially of animal fiber and one or more groups of four face warps each composed substantially of animal fiber and four back warps each finer than the face warps and essentially strong, smooth surfaced and composed of vegetable or synthetic fiber, alternating with a group of four large cord warps smooth surfaced and composed of vegetable or synthetic fiber, the cord warps weaving in pairs oppositely as flats over and under alternate wefts, the face warps forming an $$\frac{X}{1}$$

broken twill weave and the back warps a $$\frac{1}{X}$$

broken twill weave alternating successively with the face warps and where X is a number greater than 2, with the floats of the face warps thus on the face, and the floats of the back warps on the back, of the fabric, the back warps acting to hold the face warps against slipping, the face warps and wefts concealing the back warps at the face of the fabric, and the face warps spreading out and rendering inconspicuous the cord warps at the face of the fabric.

5. The method of forming a flat fabric with an essentially animal fiber face coverage which consists in interlacing wefts composed substantially of animal fiber and one or more groups of four face warps each composed substantially of animal fiber and four fine back warps each essentially strong smooth surfaced and composed of vegetable or synthetic fiber alternating with a group of four large cord warps smooth surfaced and composed of vegetable or synthetic fiber, the cord warps weaving in pairs oppositely as flats over and under alternate wefts, the face warps forming an $$\frac{X}{1}$$

broken twill weave and the back warps forming a $$\frac{1}{X}$$

broken twill weave alternating successively with the face warps and where X is a number greater than 2, with the floats of the face warps on the face, and the floats of the back warps on the back, of the fabric, the back warps acting to hold the face warps against slipping, the face warps and wefts concealing the back warps at the face of the fabric, and the face warps spreading out and rendering inconspicuous the cord warps at the face of the fabric.

6. The method of forming a flat fabric with an essentially animal fiber face coverage which consists in interlacing wefts composed substantially of animal fiber and one or more groups of four face warps each composed substantially of animal fiber and four fine back warps each essentially strong smooth surfaced and composed of vegetable or synthetic fiber alternating with a group of four large cord warps smooth surfaced and composed of vegetable or synthetic fiber, the cord warps weaving in pairs oppositely as flats over and under alternate wefts, the face warps forming a $$\frac{3}{1}$$

broken twill weave in 1, 3, 4, 2 order and the back warps forming a $$\frac{1}{3}$$

broken twill weave alternating successively with the face warps in 2, 4, 1, 3 order with the floats of the face warps thus on the face, and the floats of the back warps on the back, of the fabric, the back warps acting to hold the face warps against slipping, the face warps and wefts concealing the back warps at the face of the fabric, and the face warps spreading out and rendering inconspicuous the cord warps at the face of the fabric.

WILLIAM S. NUTTER.